US012489522B2

(12) United States Patent
Lee

(10) Patent No.: US 12,489,522 B2
(45) Date of Patent: Dec. 2, 2025

(54) CLOUD-BASED SATELLITE INFORMATION RECEPTION PROCESSING APPARATUS AND METHOD

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 614 days.

(21) Appl. No.: 18/058,842

(22) Filed: Nov. 25, 2022

(65) Prior Publication Data

US 2023/0421248 A1  Dec. 28, 2023

(30) Foreign Application Priority Data

Jun. 27, 2022  (KR) .................. 10-2022-0078063

(51) Int. Cl.
*H04B 7/185*  (2006.01)
*H04B 1/00*  (2006.01)

(52) U.S. Cl.
CPC ..... *H04B 7/18526* (2013.01); *H04B 7/18545* (2013.01); *H04B 1/0003* (2013.01)

(58) Field of Classification Search
CPC ............ H04B 7/18526; H04B 7/18545; H04B 1/0003; H04B 7/18517; H04B 7/1851
See application file for complete search history.

(56) References Cited

U.S. PATENT DOCUMENTS

| 2017/0006620 A1* | 1/2017 | Reis ................... H04W 36/302 |
| 2017/0223653 A1 | 8/2017 | Weitnauer et al. |
| 2018/0011162 A1* | 1/2018 | Bovard ................... G01S 11/02 |
| 2018/0014212 A1 | 1/2018 | Oga et al. |
| 2018/0034536 A1* | 2/2018 | Trutna ............... H04B 7/18521 |

(Continued)

FOREIGN PATENT DOCUMENTS

| KR | 10-2011698 B1 | 8/2019 |
| KR | 10-2162284 B1 | 10/2020 |

(Continued)

OTHER PUBLICATIONS

Grayver Eugene, "Realtime Wideband Modem in the Cloud—Technology and Economics", 2022 IEEE Aerospace Conference (AERO), Mar. 5, 2022, pp. 1-11, IEEE.

(Continued)

*Primary Examiner* — Ashley Shivers
(74) *Attorney, Agent, or Firm* — Studebaker Brackett PLLC

(57) ABSTRACT

Provided is technology for processing demodulation, preprocessing, etc., performed by an existing modem in a hardware form for satellite information received by a ground station at a cloud level based on a software define radio (SDR) mounted to a cloud. A cloud-based satellite information receiving and processing apparatus may include a satellite information collector configured to collect, on a cloud, satellite information received from a satellite by a ground station terminal using at least one antenna; a signal processing unit configured to perform demodulation and preprocessing of the collected satellite information on the cloud based on a software define radio (SDR) mounted to the cloud; and a storage configured to record and maintain the demodulated and preprocessed satellite information on the cloud.

16 Claims, 5 Drawing Sheets

(56) References Cited

U.S. PATENT DOCUMENTS

| | | | |
|---|---|---|---|
| 2019/0028180 A1* | 1/2019 | Schmid | H04B 10/25752 |
| 2020/0007224 A1* | 1/2020 | Hawthorne | H04B 7/18513 |
| 2025/0105914 A1* | 3/2025 | Ansell | H04W 28/065 |

FOREIGN PATENT DOCUMENTS

| | | |
|---|---|---|
| KR | 10-2262762 B1 | 6/2021 |
| KR | 10-2267766 B1 | 6/2021 |
| WO | 2017/175696 A1 | 10/2017 |
| WO | 2019/057302 A1 | 3/2019 |

OTHER PUBLICATIONS

Singh Vaibhav et al., "A community-driven approach to democratize access to satellite ground stations", Proceedings of the 27th Annual International Conference on Mobile Computing and Networking, Sep. 9, 2021, pp. 1-14, AMC.

The extended European search report issued by the European Patent Office on Aug. 14, 2023, which corresponds to European Patent Application No. 22209033.4-1206 and is related to U.S. Appl. No. 18/058,842.

\* cited by examiner

CLOUD-BASED SATELLITE INFORMATION RECEPTION PROCESSING APPARATUS AND METHOD

CROSS-REFERENCE TO RELATED APPLICATIONS

This application claims the benefit under 35 USC § 119(a) of Korean Patent Application No. 10-2022-0078063 filed on Jun. 27, 2022 in the Korean Intellectual Property Office, the entire disclosure of which is incorporated herein by reference for all purposes.

BACKGROUND

1. Field

At least one example embodiment relates to technology for cloud-based satellite information reception and processing, and more particularly, to technology for processing demodulation, preprocessing, etc., performed by an existing modem in a hardware form for satellite information received by a ground station at a cloud level based on a software define radio (SDR) mounted to a cloud.

2. Description of Related Art

An artificial satellite refers to an object that may fly in a predetermined circle or an elliptical orbit around the earth. The artificial satellite may be mounted on a launch vehicle and then fired to enter a predetermined orbit in the space and to perform a variety of predefined operations in the orbit. The artificial satellite functions to exchange data with other ground-based communication/electronic devices (e.g., satellite antennas and set-top boxes connected thereto) and/or to observe the ground surface while orbiting the earth.

To control, for example, monitor the artificial satellite or the launch vehicle and to receive data gathered by the artificial satellite, a space ground station is installed on the ground. The space ground station may communicate with the artificial satellite based on a standardized frequency and communication protocol, may transmit a control signal for a specific operation (e.g., photographing) to the artificial satellite and/or receive data (e.g., image data on the ground surface) acquired by the artificial satellite based on the specific operation, and may perform a variety of processing based on the received data.

Currently, about 1,600 artificial satellites are orbiting the earth and the number of artificial satellites around the earth are expected to increase as a space market is evolved from government-led development to private-led development.

An antenna, a receiver, and a modem need to be included in a ground station terminal.

This modem operates according to a different protocol or outputs a result in a different format for each manufacturer.

Representative examples include Safran's modem in France, Krato's modem in the US, and Antewer's modem in Belgium. The output from such a modem needs to suffer the inconvenience of converting to a common signal to implement the Consultative Committee for Space Data Systems (CCSDS) of space communication.

Cited References include Korean Patent Registration No. 2162284 titled "cloud data processing GNSS jamming monitoring method and system" and Korean Patent Registration No. 2267766 titled "system and method for image navigation and registration of satellites."

SUMMARY

An objective of at least one example embodiment is to provide a flexible and universal satellite information reception technology by implementing satellite signal processing, different for each manufacturer of a modem of a ground station or a satellite, in software at a cloud level.

An objective of at least one example embodiment is to stably and quickly process satellite information by collectively processing reception, storage, preprocessing, and utilization of a satellite signal at a cloud level.

An objective of at least one example embodiment is to quickly and conveniently perform maintenance, management, and update of a modem by implementing the modem of a ground station, implemented in hardware, in software on a cloud.

An objective of at least one example embodiment is to prevent a hacking attempt against a modem by implementing the modem of a ground station, implemented in hardware, in software on a cloud.

According to an aspect of at least one example embodiment, there is provided an apparatus for receiving and processing satellite information based on a cloud, the apparatus including a satellite information collector configured to collect, on the cloud, satellite information received from a satellite by a ground station terminal using at least one antenna; a signal processing unit configured to perform demodulation and preprocessing of the collected satellite information on the cloud based on a software define radio (SDR) mounted to the cloud; and a storage configured to record and maintain the demodulated and preprocessed satellite information on the cloud.

The satellite information collector according to an example embodiment may be configured to collect information including at least one of satellite state information and observation image data as the satellite information.

The cloud-based satellite information reception and processing apparatus according to an example embodiment may further include a satellite information application processing unit configured to perform application processing based on the recorded and maintained satellite information.

The satellite information application processing unit according to an example embodiment may be configured to generate a standard image for the satellite information by performing at least one level 2 processing among radio metric processing, geometry processing, and spatial metric processing.

The satellite information collector according to an example embodiment may be configured to receive a plurality of pieces of satellite information through a satellite communication network using a plurality of frequency bands, and the signal processing unit may be configured to perform demodulation and preprocessing in consideration of a transmission path for the plurality of pieces of satellite information based on the SDR on the cloud.

The satellite information collector according to an example embodiment may be configured to collect variable length satellite information each with a different size, and the signal processing unit may be configured to restore the satellite information by performing sequential demodulation on each of frames that constitute the collected satellite information based on a reception completion point in time that is calculated based on an idle band used for transmission of the satellite information and a frame length mapped to the idle band.

The satellite information collector according to an example embodiment may be configured to collect first data in a form of an optical signal and second data in a form of a radio frequency (RF) signal as the satellite information, and the signal processing unit may be configured to demodulate and preprocess each of the first data in the form of the optical signal and the second data in the form of the RF signal, and to estimate data that is determined to be transmitted from the satellite using the demodulated and preprocessed first data and second data.

The signal processing unit according to an example embodiment may be configured to perform a signal quality determination process of determining a higher signal quality between a signal quality of the first data and a signal quality of the second data, to when one of a first signal quality and a second signal quality is less than or equal to a threshold, estimate data that is transmitted from the satellite using a signal corresponding to a higher signal quality between the first signal quality and the second signal quality, to when all of the first signal quality and the second signal quality are greater than or equal to the threshold, compare a first data estimation performance estimated from the first data and a second data estimation performance estimated from the second data, and to select estimation data of a data source with a higher estimation performance between the first data estimation performance and the second data estimation performance in a specific time section having different estimation data, and the storage may be configured to record and maintain satellite information corresponding to the estimated data.

According to an aspect of at least one example embodiment, there is provided a method of receiving and processing satellite information based on a cloud, the method including collecting, on the cloud, satellite information received from a satellite by a ground station terminal using at least one antenna; performing demodulation and preprocessing of the collected satellite information on the cloud based on an SDR mounted to the cloud; and recording and maintaining the demodulated and preprocessed satellite information on the cloud.

The collecting of the satellite information on the cloud according to an example embodiment may include collecting information including at least one of satellite state information and observation image data as the satellite information.

The cloud-based satellite information reception and processing method according to an example embodiment may further include performing application processing based on the recorded and maintained satellite information.

The performing of the application processing according to an example embodiment may include generating a standard image for the satellite information by performing at least one level 2 processing among radio metric processing, geometry processing, and spatial metric processing.

The collecting of the satellite information according to an example embodiment may include receiving a plurality of pieces of satellite information through a satellite communication network using a plurality of frequency bands, and the performing of the demodulation and the preprocessing may include performing demodulation and preprocessing in consideration of a transmission path for the plurality of pieces of satellite information based on the SDR on the cloud.

The collecting of the satellite information according to an example embodiment may include collecting variable length satellite information each with a different size, and the performing of the demodulation and the preprocessing may include restoring the satellite information by performing sequential demodulation on each of frames that constitute the collected satellite information based on a reception completion point in time that is calculated based on an idle band used for transmission of the satellite information and a frame length mapped to the idle band.

The collecting of the satellite information according to an example embodiment may include collecting first data in a form of an optical signal and second data in a form of a radio frequency (RF) signal as the satellite information, and the performing of the demodulation and preprocessing may include demodulating and preprocessing each of the first data in the form of the optical signal and the second data in the form of the RF signal; and estimating data that is determined to be transmitted from the satellite using the demodulated and preprocessed first data and second data.

The demodulating and the preprocessing according to an example embodiment may include determining a higher signal quality between a signal quality of the first data and a signal quality of the second data; when one of a first signal quality and a second signal quality is less than or equal to a threshold, estimating data that is transmitted from the satellite using a signal corresponding to a higher signal quality between the first signal quality and the second signal quality; when all of the first signal quality and the second signal quality are greater than or equal to the threshold, comparing a first data estimation performance estimated from the first data and a second data estimation performance estimated from the second data; and selecting estimation data of a data source with a higher estimation performance between the first data estimation performance and the second data estimation performance in a specific time section having different estimation data, and the recording and the maintaining of the demodulated and preprocessed satellite information on the cloud may include recording and maintaining satellite information corresponding to the estimated data.

According to some example embodiments, it is possible to provide a flexible and universal satellite information reception technology by implementing satellite signal processing, different for each manufacturer of a modem of a ground station or a satellite, in software at a cloud level.

According to some example embodiments, it is possible to stably and quickly process satellite information by collectively processing reception, storage, preprocessing, and utilization of a satellite signal at a cloud level.

According to some example embodiments, it is possible to quickly and conveniently perform maintenance, management, and update of a modem by implementing the modem of a ground station, implemented in hardware, in software on a cloud.

According to some example embodiments, it is possible to prevent a hacking attempt against a modem by implementing the modem of a ground station, implemented in hardware, in software on a cloud.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
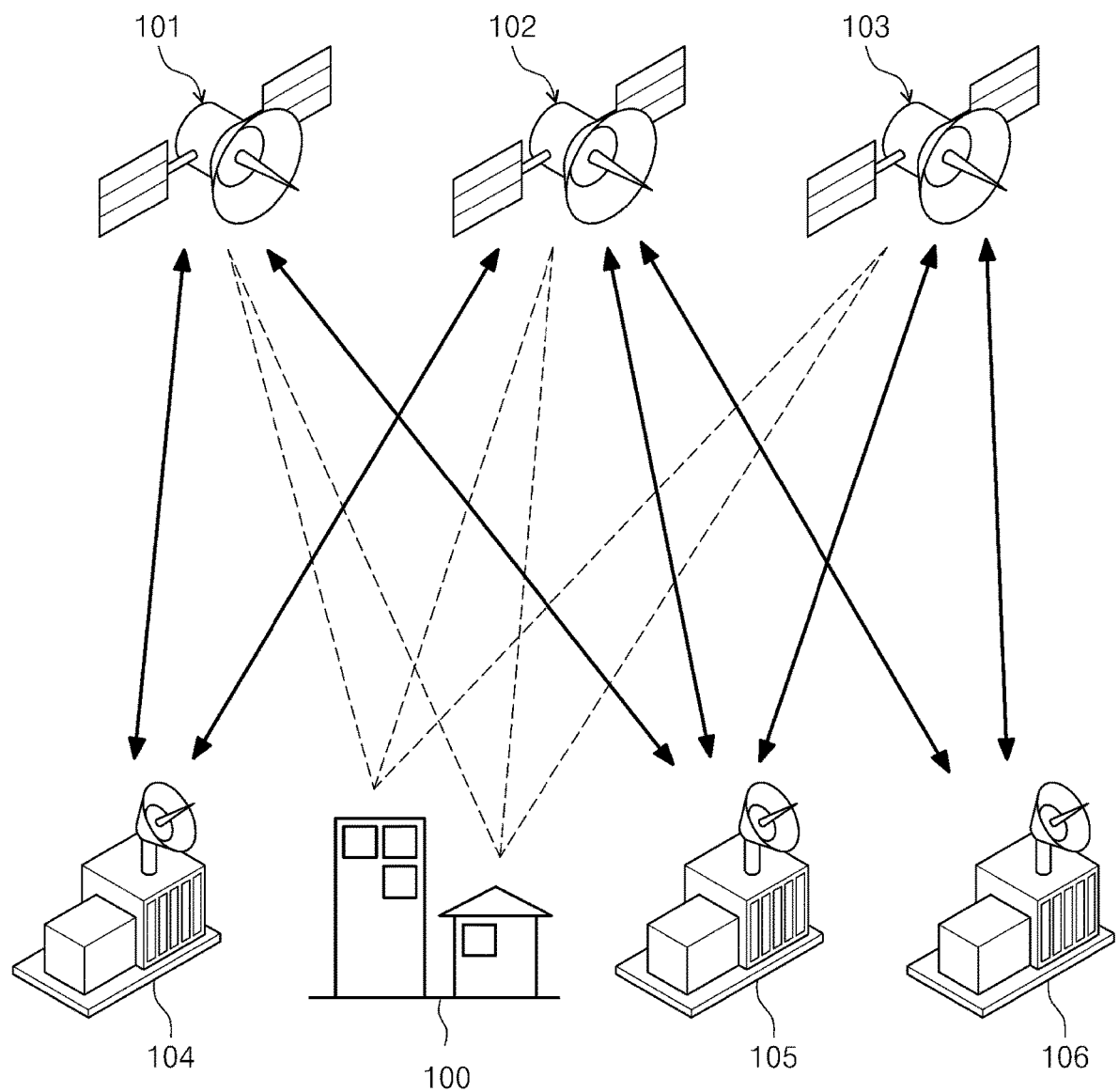
FIG. 1 illustrates an example of an artificial satellite and a ground station according to an example embodiment.

Specific structural or functional descriptions related to example embodiments according to the concept of the present invention set forth herein are simply provided to explain the example embodiments according to the concept of the present invention and the example embodiments according to the concept of the present invention may be implemented in various forms and are not limited to the example embodiments described herein.

Various modifications may be made to the example embodiments according to the concept of the present invention. Therefore, the example embodiments are illustrated in the drawings and are described in detail with reference to the detailed description. However, the example embodiments are not construed as being limited to the specific disclosure and should be understood to include all changes, equivalents, and replacements within the idea and the technical scope of the present invention.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. However, the scope of the claims is not limited to or restricted by such example embodiments. Like reference numerals refer to like components throughout.

FIG. 1 illustrates an example of an artificial satellite and a ground station according to an example embodiment.

According to an example embodiment, one of ground stations, for example, first to third ground stations 104, 105, and 106, may be configured to communicate with a plurality of artificial satellites, for example, first to third artificial satellites 101, 102, and 103, and/or the plurality of ground stations, the first to third ground stations 104, 105, and 106, may be configured to communicate with one of the artificial satellites, for example, the first to third artificial satellites 101, 102, and 103.

For example, referring to FIG. 1. the first ground station 104 may communicably connect to the first artificial satellite 101 and the second artificial satellite 102 among the first to third artificial satellites 101, 102, and 103 and accordingly, may transmit a control signal to the first artificial satellite 101 and the second artificial satellite 102, or may receive satellite data from the first artificial satellite 101 and the second artificial satellite 102. In this case, the first ground station 104 may not communicate with the third artificial satellite 103 and accordingly, may not transmit a control signal to or receive data from the third artificial satellite 103. Also, the second ground station 105 may communicably connect to the first artificial satellite 102, the second artificial satellite 102, and the third artificial satellite 103, and the third ground station 106 may communicably connect to the second artificial satellite 102 and the third artificial satellite 103.

Accordingly, the first artificial satellite 101 may communicate with the first ground station 104 and the second ground station 105, the second artificial satellite 102 may communicate with the first ground station 104, the second ground station 105, and the third ground station 106, and the third artificial satellite 103 may communicate with the second ground station 105 and the third ground station 106.

Relations between the first to third ground stations 104 to 106 and the first to third artificial satellites 101 to 103 of FIG. 1 are provided as an example only. In addition, the first to third ground stations 104 to 106 and the first to third artificial satellites 101 to 103 may be communicably interconnected through a variety of methods.

Depending on example embodiments, specific at least one ground station may be configured to communicate with only specific at least one artificial satellite. On the contrary, specific at least one artificial satellite may be configured to communicate only with specific at least one ground station.

Also, at least one ground station 104 to 106 may be designed to communicate with only at least one artificial satellite 101 to 103 moving in a relatively near distance.

That is, at least one ground station 104 to 106 corresponding to at least one artificial satellite 101 to 103 may be determined based on a distance therebetween.

Figure 2:
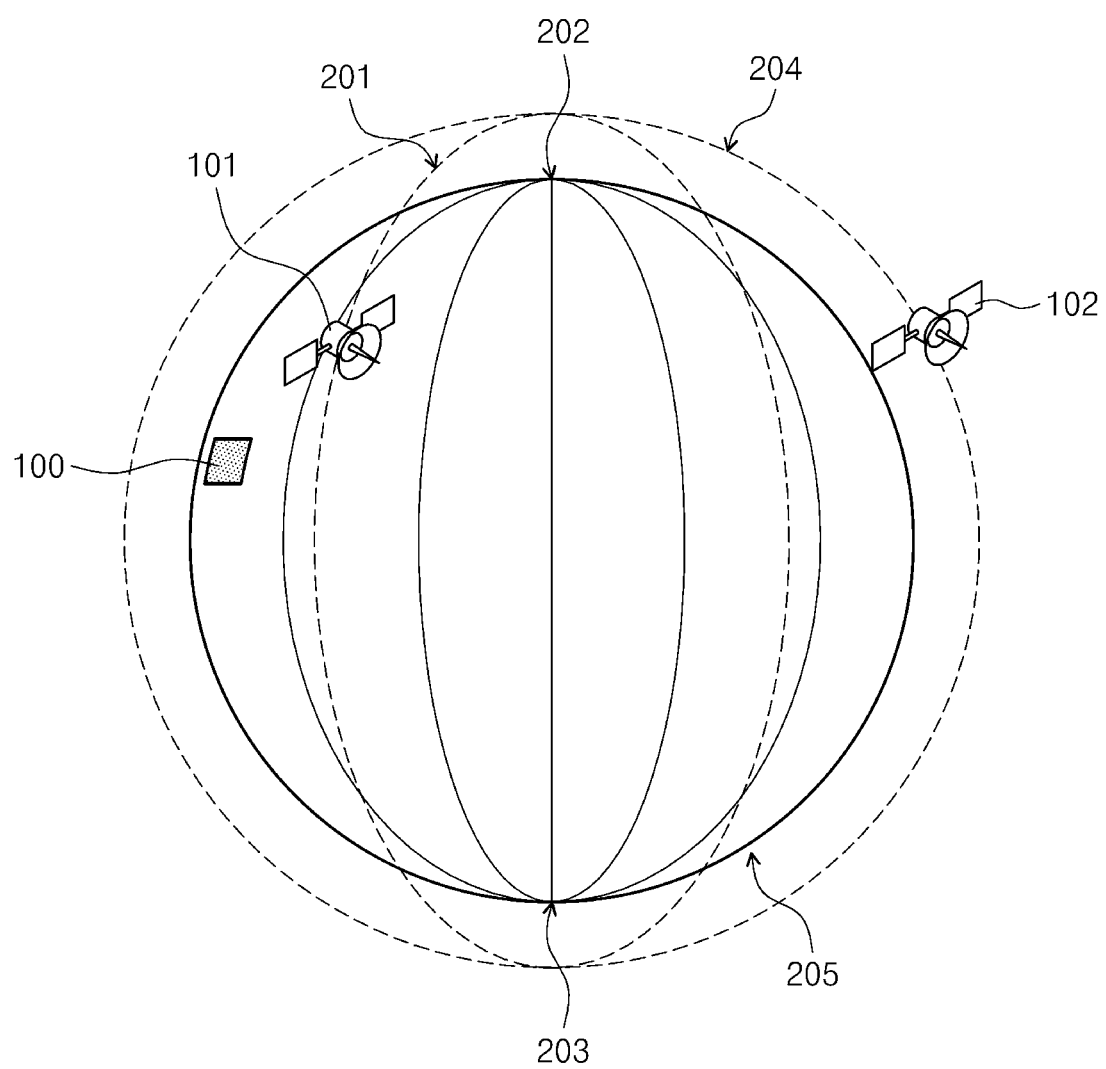
FIG. 2 illustrates an example of a movement of an artificial satellite according to an example embodiment.

FIG. 2 illustrates an example of describing a movement of an artificial satellite according to an example embodiment.

Referring to FIG. 2, each of the first and second artificial satellites 101 and 102 moves along a predetermined orbit formed in the atmosphere of the earth 205. In this case, orbits 204 and 201 of the first and second artificial satellites 101 and 102 may be polar orbits. The polar orbits refer to orbits orthogonal through or around the north pole 202 and the south pole 203. If the first and second artificial satellites 101 and 102 move along the polar orbits, the rotation of the earth 205 may allow the first and second artificial satellites 101 and 102 to pass over most of the regions on the earth 205. Therefore, if the first and second artificial satellites 101 and 102 are equipped with terrestrial photographing equipment, the first and second artificial satellites 101 and 102 may capture a substantial portion of the ground surface.

According to an example embodiment, the first artificial satellite 101 may include a small or micro artificial satellite, for example, CubeSat. The CubeSat refers to a micro artificial satellite with a volume of about 10 cm^3 or less and a mass of 1.33 kg or less. The CubeSat is small, light, mountable with a camera, and relatively low-priced for manufacture and launch, however, has a relatively insufficient space to store data. Accordingly, the CubeSat caches gathered data during a short period of time and discards or deletes the data after a predetermined period of time.

Hereinafter, technology for processing demodulation, preprocessing, etc., performed by an existing modem in a hardware form for satellite information received by a ground station at a cloud level based on a software define radio (SDR) mounted to a cloud is described with reference to FIGS. 3 to 5.

Figure 3:
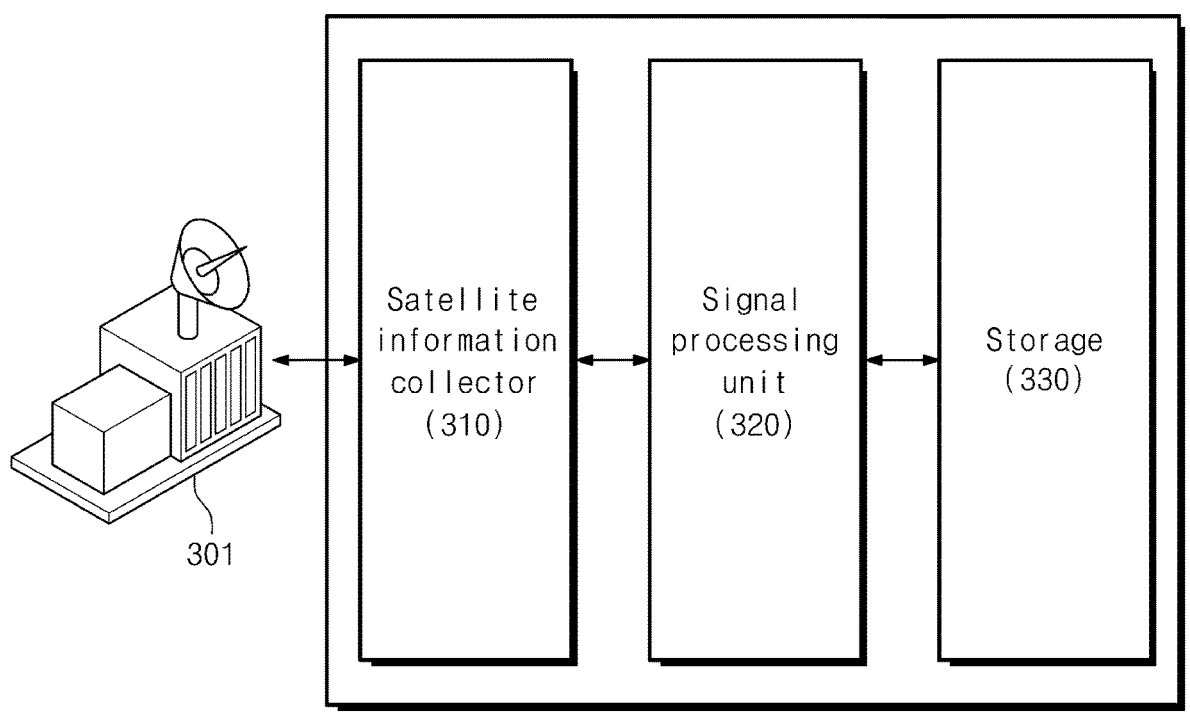
FIG. 3 illustrates an example of a satellite information reception and processing apparatus according to an example embodiment.

FIG. 3 illustrates an example of a satellite information reception and processing apparatus 300 according to an example embodiment.

Using the satellite information reception and processing apparatus 300 according to an example embodiment, it is possible to provide a flexible and universal satellite information reception technology by implementing satellite signal processing, different for each manufacturer of a modem of a ground station or a satellite, in software at a cloud level.

Also, using the satellite information reception and processing apparatus 300 according to an example embodiment, it is possible to stably and quickly process satellite information by collectively processing reception, storage, preprocessing, and utilization of a satellite signal at a cloud level and to quickly and conveniently perform maintenance, management, and update of a modem by implementing the modem of a ground station, which was implemented in hardware, in software on a cloud.

Also, using the satellite information reception and processing apparatus 300 according to an example embodiment, it is possible to prevent a hacking attempt against a modem by implementing the modem of a ground station, implemented in hardware, in software on a cloud.

To this end, the satellite information reception and processing apparatus 300 according to an example embodiment may include a satellite information collector 310, a signal processing unit 320, and a storage 330.

The satellite information collector 310 according to an example embodiment may collect, on the cloud, satellite information received from a satellite by a ground station terminal using at least one antenna.

According to an example embodiment, the satellite information collector 310 may perform preprocessing, such as demodulating satellite information received from the ground station terminal to a signal for space communication and formatting the same to a format of the Consultative Committee for Space Data Systems (CCSDS).

Here, the ground station terminal may include a first antenna configured to receive an optical signal that includes data from the satellite and a second antenna configured to receive a radio frequency (RF) signal that includes data from the satellite.

Also, the satellite information reception and processing apparatus 300 may perform an operation instead of a processor configured to demodulate satellite information and to estimate data that is determined to have been transmitted from the satellite and to transmit the estimated data to a data sever through interaction with the ground station terminal on a cloud level.

The ground station terminal may further include a transmitter configured to transmit an optical signal or an RF signal to the satellite.

The ground station terminal may include a receiver, a transmitter, and a communicator, and the first antenna and the second antenna may be configured to direct the same direction, and, when a received signal quality is less than or equal to a threshold, a directional direction of an antenna may be changed.

The satellite information collector 310 may collect information including at least one of satellite state information (telemetry (TM)) and observation image data (satellite image (SI)) as the satellite information.

In general, satellites may transmit satellite state information (TM) through signals and the transmitted satellite state information (TM) may indicate an abnormal state of a corresponding satellite. In this case, receivers of a ground station include safety devices to prevent the use of the satellite in the abnormal state.

States of all satellites are included in a navigation message transmitted from each satellite. When a single satellite is set as a satellite in an abnormal sate, the corresponding satellite in the abnormal state may be regarded as an abnormal satellite until a new satellite message is received. Receivers do not observe the abnormal satellite or do not use the abnormal satellite for location calculation. Although the satellite in the abnormal state returns to a normal state immediately after orbit information is received, the satellite is regarded as the abnormal satellite until a new satellite message is received. Therefore, new satellite state information (TM) needs to be received before using this satellite signal.

The observation image data (SI) represents an image observed for the original purpose of the satellite. In the case of observation image data (SI) of the satellite corresponding to the purpose of observing the space, an image outside the earth may be transmitted as the observation image data. In the case of observation image data corresponding to the purpose of observing the earth, an image of the earth may be transmitted as the observation image data.

The signal processing unit 320 according to an example embodiment may perform demodulation and preprocessing of the collected satellite information on the cloud based on a software define radio (SDR) mounted to the cloud.

The storage 330 according to an example embodiment may record and maintain the demodulated and preprocessed satellite information on the cloud.

In detail, for example, the satellite information collector 310 may receive a plurality of pieces of satellite information through a satellite communication network using a plurality of frequency bands.

Here, the signal processing unit 320 may perform demodulation and preprocessing in consideration of a transmission path for the plurality of pieces of satellite information based on the SDR on the cloud.

To this end, the satellite information collector 310 may collect variable length satellite information each with a different size. The signal processing unit 320 may restore the satellite information by performing sequential demodulation on each of frames that constitute the collected satellite information based on a reception completion point in time that is calculated based on an idle band used for transmission of the satellite information and a frame length mapped to the idle band.

Also, the satellite information collector 310 may collect first data in a form of an optical signal and second data in a form of an RF signal as the satellite information.

The signal processing unit 320 may demodulate and preprocess each of the first data in the form of the optical signal and the second data in the form of the RF signal.

Also, the signal processing unit 320 may estimate data that is determined to be transmitted from the satellite using the demodulated and preprocessed first data and second data.

Also, the signal processing unit 320 may perform a signal quality determination process of determining a higher signal quality between a signal quality of the first data and a signal quality of the second data, and when one of a first signal quality and a second signal quality is less than or equal to a threshold, estimate data that is transmitted from the satellite using a signal corresponding to a higher signal quality between the first signal quality and the second signal quality.

Also, when all of the first signal quality and the second signal quality are greater than or equal to the threshold, the signal processing unit 320 may compare a first data estimation performance estimated from the first data and a second data estimation performance estimated from the second data and may select estimation data of a data source with a higher estimation performance between the first data estimation performance and the second data estimation performance in a specific time section having different estimation data.

The storage 330 may record and maintain only satellite information corresponding to the estimated data.

Figure 4:
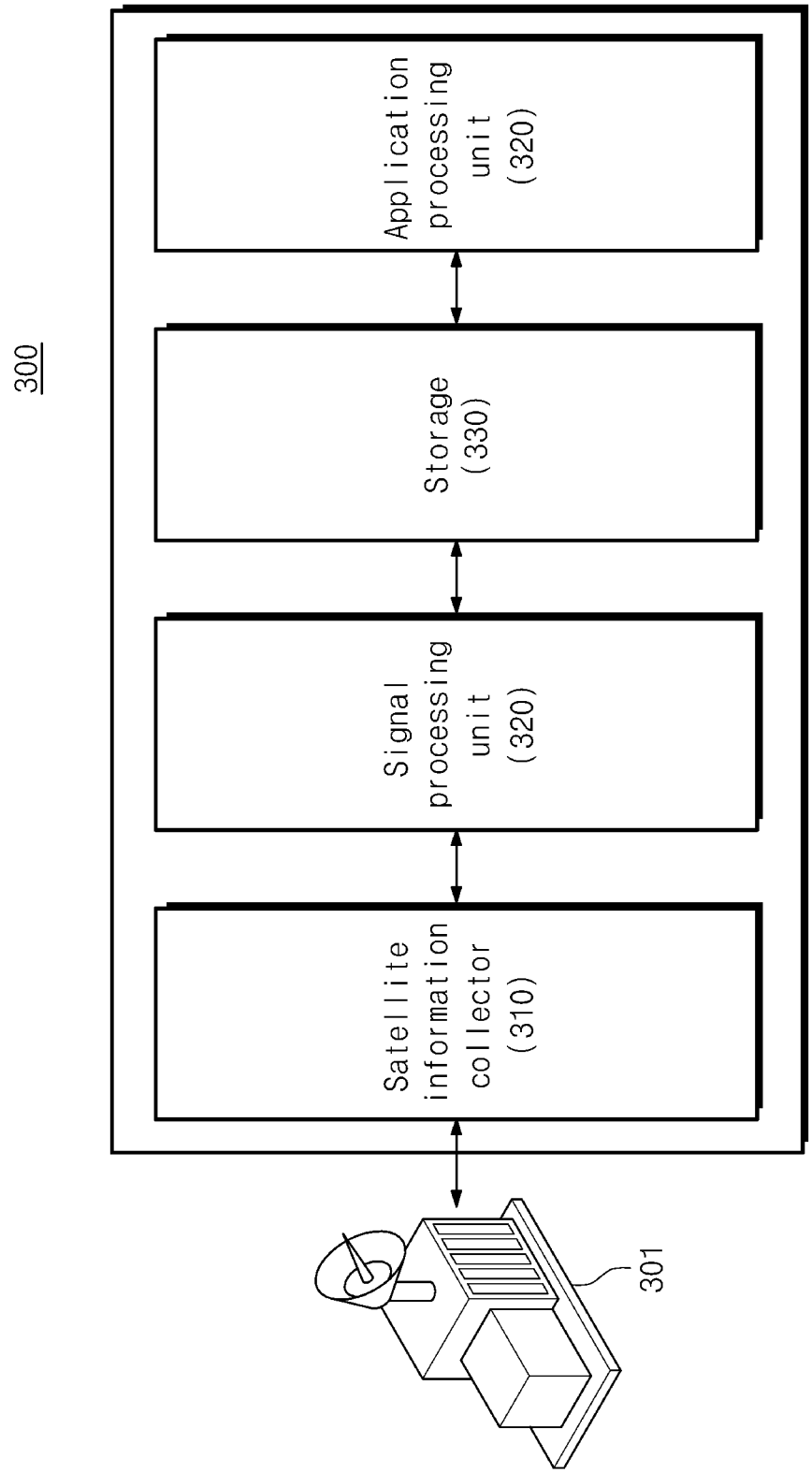
FIG. 4 illustrates another example of a satellite information reception and processing apparatus according to an example embodiment.

FIG. 4 illustrates another example of a satellite information reception and processing apparatus 400 according to an example embodiment.

The satellite information reception and processing apparatus 400 according to an example embodiment may further include an application processing unit 410 in addition to the satellite information collector 310, the signal processing unit 320, and the storage 330.

The application processing unit 410 according to an example embodiment may perform application processing based on the recorded and maintained satellite information.

Also, the application processing unit 410 according to an example embodiment may generate a standard image for the satellite information by performing at least one level 2 processing among radio metric processing, geometry processing, and spatial metric processing.

Also, the application processing unit 410 according to an example embodiment may process the standard image generated through level 2 processing to be used for disaster, national defense, smart city, and the like.

Figure 5:
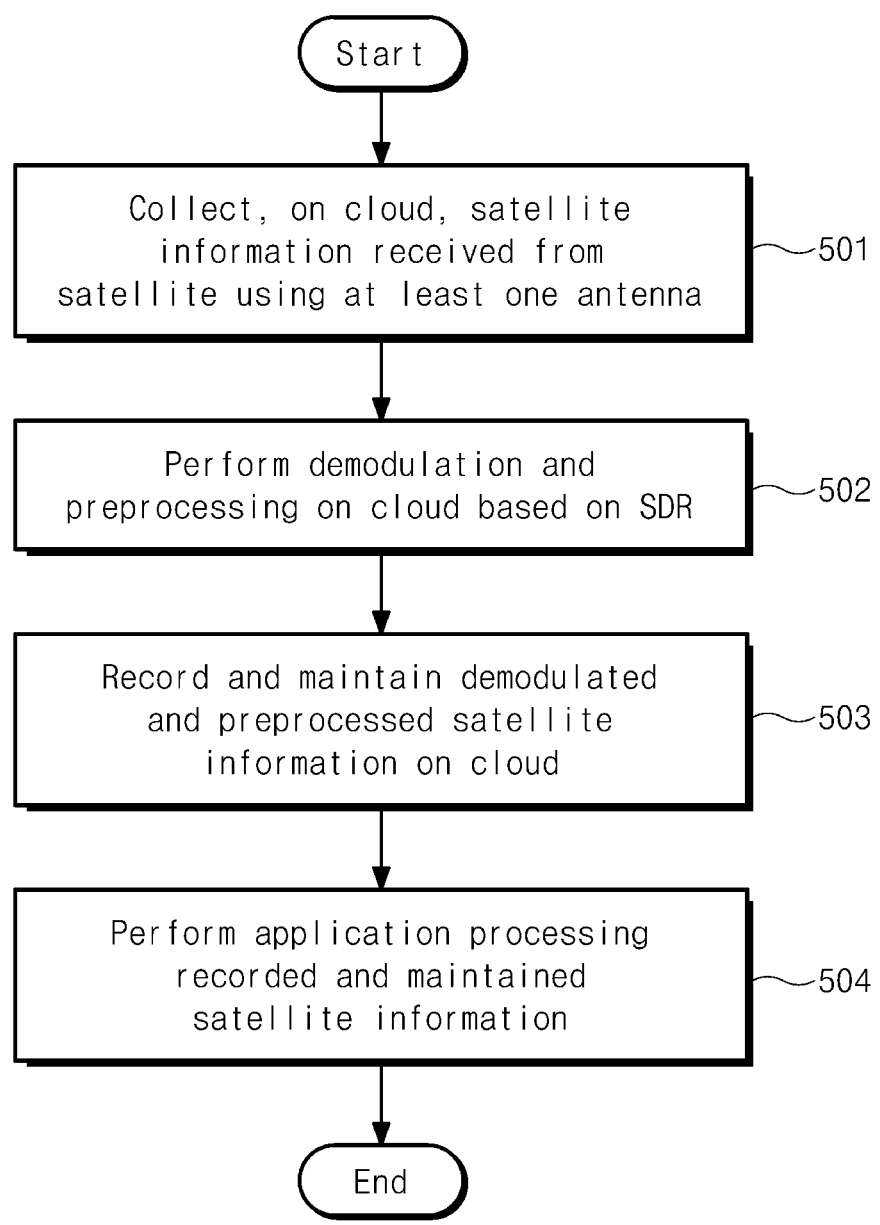
FIG. 5 is a flowchart illustrating an example of a satellite information reception and processing method according to an example embodiment.

FIG. 5 is a flowchart illustrating an example of a satellite information reception and processing method according to an example embodiment.

In operation 501, the satellite information reception and processing method according to an example embodiment may collect, on a cloud, satellite information received from a satellite by a ground station terminal using at least one antenna.

For example, the satellite information reception and processing method according to an example embodiment may collect information including at least one of satellite state information and observation image data as the satellite information.

In operation 502, the satellite information reception and processing method according to an example embodiment may perform demodulation and preprocessing of the collected satellite information on the cloud based on an SDR mounted to the cloud.

In the process of collecting the satellite information, the satellite information reception and processing method according to an example embodiment may receive a plurality of pieces of satellite information through a satellite communication network using a plurality of frequency bands.

Also, in this case, in the process of performing demodulation and preprocessing, the satellite information reception and processing method according to an example embodiment may perform demodulation and preprocessing in consideration of a transmission path for the plurality of pieces of satellite information based on the SDR on the cloud.

The satellite information reception and processing method according to an example embodiment may collect variable length satellite information each with a different size.

In this case, for demodulation and preprocessing, the satellite information reception and processing method according to an example embodiment may restore the satellite information by performing sequential demodulation on each of frames that constitute the collected satellite information based on a reception completion point in time that is calculated based on an idle band used for transmission of the satellite information and a frame length mapped to the idle band.

Also, the satellite information reception and processing method according to an example embodiment may collect first data in a form of an optical signal and second data in a form of an RF signal as the satellite information to collect the satellite information, and may demodulate and process each of the first data in the form of the optical signal and the second data in the form of the RF signal for demodulation and preprocessing.

Also, the satellite information reception and processing method according to an example embodiment may estimate data that is determined to be transmitted from the satellite using the demodulated and preprocessed first data and second data.

Meanwhile, the satellite information reception and processing method according to an example embodiment may perform the following process for demodulation and preprocessing.

Initially, the satellite information reception and processing method according to an example embodiment may determine a higher signal quality between a signal quality of the first data and a signal quality of the second data, and when one of a first signal quality and a second signal quality is less than or equal to a threshold, may estimate data that is transmitted from the satellite using a signal corresponding to a higher signal quality between the first signal quality and the second signal quality.

Also, when all of the first signal quality and the second signal quality are greater than or equal to the threshold, the satellite information reception and processing method according to an example embodiment may compare a first data estimation performance estimated from the first data and a second data estimation performance estimated from the second data.

The satellite information reception and processing method according to an example embodiment may select estimation data of a data source with a higher estimation performance between the first data estimation performance and the second data estimation performance in a specific time section having different estimation data.

In this case, the satellite information reception and processing method according to an example embodiment may record and maintain only satellite information corresponding to the estimated data.

In operation 503, the satellite information reception and processing method may record and maintain the demodulated and preprocessed satellite information on the cloud.

The satellite information reception and processing method according to an example embodiment may perform application processing based on the recorded and maintained satellite information.

For example, to perform application processing, the satellite information reception and processing method according to an example embodiment may generate a standard image for the satellite information by performing at least one level 2 processing among radio metric processing, geometry processing, and spatial metric processing.

As described above, according to some example embodiments, it is possible to provide a flexible and universal satellite information reception technology by implementing satellite signal processing, different for each manufacturer of a modem of a ground station or a satellite, in software at a cloud level.

Also, it is possible to stably and quickly process satellite information by collectively processing reception, storage, preprocessing, and utilization of a satellite signal at a cloud level and to quickly and conveniently perform maintenance, management, and update of a modem by implementing the modem of a ground station, which was implemented in hardware, in software on a cloud.

Also, it is possible to prevent a hacking attempt against a modem by implementing the modem of a ground station, implemented in hardware, in software on a cloud.

The apparatuses described herein may be implemented using hardware components, software components, and/or a combination thereof.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The method according to the above-described example embodiments may be recorded in non-transitory computer-readable media including such program instructions to implement various operations which may be performed through various computer methods.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for receiving and processing satellite information based on a cloud, the apparatus comprising:
   a satellite information collector configured to collect, on the cloud, satellite information received from a satellite by a ground station terminal using at least one antenna;
   a signal processing unit configured to perform demodulation and preprocessing of the collected satellite information on the cloud based on a software define radio (SDR) mounted to the cloud; and
   a storage configured to record and maintain the demodulated and preprocessed satellite information on the cloud.

2. The apparatus of claim 1, wherein the satellite information collector is configured to collect information including at least one of satellite state information and observation image data as the satellite information.

3. The apparatus of claim 1, further comprising:
   a satellite information application processing unit configured to perform application processing based on the recorded and maintained satellite information.

4. The apparatus of claim 3, wherein the satellite information application processing unit is configured to generate a standard image for the satellite information by performing at least one level 2 processing among radio metric processing, geometry processing, and spatial metric processing.

5. The apparatus of claim 1, wherein the satellite information collector is configured to receive a plurality of pieces of satellite information through a satellite communication network using a plurality of frequency bands, and
   the signal processing unit is configured to perform demodulation and preprocessing in consideration of a transmission path for the plurality of pieces of satellite information based on the SDR on the cloud.

6. The apparatus of claim 1, wherein the satellite information collector is configured to collect variable length satellite information each with a different size, and
   the signal processing unit is configured to restore the satellite information by performing sequential demodulation on each of frames that constitute the collected satellite information based on a reception completion point in time that is calculated based on an idle band used for transmission of the satellite information and a frame length mapped to the idle band.

7. The apparatus of claim 1, wherein the satellite information collector is configured to collect first data in a form of an optical signal and second data in a form of a radio frequency (RF) signal as the satellite information, and
   the signal processing unit is configured to demodulate and preprocess each of the first data in the form of the optical signal and the second data in the form of the RF signal, and to estimate data that is determined to be transmitted from the satellite using the demodulated and preprocessed first data and second data.

8. The apparatus of claim 7, wherein the signal processing unit is configured to,
   perform a signal quality determination process of determining a higher signal quality between a signal quality of the first data and a signal quality of the second data,
   when one of a first signal quality and a second signal quality is less than or equal to a threshold, estimate data that is transmitted from the satellite using a signal corresponding to a higher signal quality between the first signal quality and the second signal quality,
   when all of the first signal quality and the second signal quality are greater than or equal to the threshold, compare a first data estimation performance estimated from the first data and a second data estimation performance estimated from the second data, and
   select estimation data of a data source with a higher estimation performance between the first data estimation performance and the second data estimation performance in a specific time section having different estimation data, and
   the storage is configured to record and maintain satellite information corresponding to the estimated data.

9. A method of receiving and processing satellite information based on a cloud, the method comprising:
   collecting, on the cloud, satellite information received from a satellite by a ground station terminal using at least one antenna;
   performing demodulation and preprocessing of the collected satellite information on the cloud based on a software define radio (SDR) mounted to the cloud; and
   recording and maintaining the demodulated and preprocessed satellite information on the cloud.

10. The method of claim 9, wherein the collecting of the satellite information on the cloud comprises collecting information including at least one of satellite state information and observation image data as the satellite information.

11. The method of claim 9, further comprising:
    performing application processing based on the recorded and maintained satellite information.

12. The method of claim 11, wherein the performing of the application processing comprises generating a standard image for the satellite information by performing at least one level 2 processing among radio metric processing, geometry processing, and spatial metric processing.

13. The method of claim 9, wherein the collecting of the satellite information comprises receiving a plurality of pieces of satellite information through a satellite communication network using a plurality of frequency bands, and the performing of the demodulation and the preprocessing comprises performing demodulation and preprocessing in consideration of a transmission path for the plurality of pieces of satellite information based on the SDR on the cloud.

14. The method of claim 9, wherein the collecting of the satellite information comprises collecting variable length satellite information each with a different size, and the performing of the demodulation and the preprocessing comprises restoring the satellite information by performing sequential demodulation on each of frames that constitute the collected satellite information based on a reception completion point in time that is calculated based on an idle band used for transmission of the satellite information and a frame length mapped to the idle band.

15. The method of claim 9, wherein the collecting of the satellite information comprises collecting first data in a form of an optical signal and second data in a form of a radio frequency (RF) signal as the satellite information, and the performing of the demodulation and preprocessing comprises:

demodulating and preprocessing each of the first data in the form of the optical signal and the second data in the form of the RF signal; and estimating data that is determined to be transmitted from the satellite using the demodulated and preprocessed first data and second data.

16. The method of claim 15, wherein the demodulating and the preprocessing comprises:

determining a higher signal quality between a signal quality of the first data and a signal quality of the second data;

when one of a first signal quality and a second signal quality is less than or equal to a threshold, estimating data that is transmitted from the satellite using a signal corresponding to a higher signal quality between the first signal quality and the second signal quality;

when all of the first signal quality and the second signal quality are greater than or equal to the threshold, comparing a first data estimation performance estimated from the first data and a second data estimation performance estimated from the second data; and selecting estimation data of a data source with a higher estimation performance between the first data estimation performance and the second data estimation performance in a specific time section having different estimation data, and the recording and the maintaining of the demodulated and preprocessed satellite information on the cloud comprises recording and maintaining satellite information corresponding to the estimated data.

* * * * *